(12) United States Patent
Parmeshwar et al.

(10) Patent No.: US 10,796,424 B2
(45) Date of Patent: Oct. 6, 2020

(54) SHALE SHAKER IMAGING SYSTEM

(71) Applicant: Schlumberger Technology Corporation, Houston, TX (US)

(72) Inventors: Vishwanathan Parmeshwar, Houston, TX (US); Jacques Orban, Katy, TX (US); Babak Bob Arefi, Spring, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 963 days.

(21) Appl. No.: 14/982,510

(22) Filed: Dec. 29, 2015

(65) Prior Publication Data
US 2017/0161885 A1    Jun. 8, 2017

Related U.S. Application Data

(60) Provisional application No. 62/263,452, filed on Dec. 4, 2015.

(51) Int. Cl.
| | | |
|---|---|---|
| *E21B 49/00* | (2006.01) | |
| *G06T 7/00* | (2017.01) | |
| *G01N 21/88* | (2006.01) | |
| *E21B 7/00* | (2006.01) | |
| *E21B 21/06* | (2006.01) | |
| *G06K 9/62* | (2006.01) | |
| *H04N 5/247* | (2006.01) | |

(52) U.S. Cl.
CPC .............. *G06T 7/0004* (2013.01); *E21B 7/00* (2013.01); *E21B 21/065* (2013.01); *E21B 49/003* (2013.01); *G01N 21/88* (2013.01); *G06K 9/6201* (2013.01); *G06T 7/001* (2013.01); *H04N 5/247* (2013.01); *G06T 2207/10048* (2013.01); *G06T 2207/30164* (2013.01)

(58) Field of Classification Search
CPC ................... G06T 7/0004; G06T 7/001; G06T 2207/10048; G06T 2207/30164; E21B 7/00; E21B 21/065; E21B 49/003; G01N 21/88; G06K 9/6201; H04N 5/247
See application file for complete search history.

(56) References Cited

U.S. PATENT DOCUMENTS

| | | | |
|---|---|---|---|
| 9,912,918 B2* | 3/2018 | Samuel | .................. H04N 7/185 |
| 2009/0001269 A1* | 1/2009 | Tadano | .................. H04N 5/247 |
| | | | 250/330 |
| 2012/0242822 A1 | 9/2012 | Rodney et al. | |
| 2014/0020954 A1 | 1/2014 | Pelletier et al. | |
| 2014/0046628 A1 | 2/2014 | Ligneul et al. | |
| 2014/0333754 A1 | 11/2014 | Graves et al. | |
| 2014/0361466 A1* | 12/2014 | Kimour | .................... G01N 1/36 |
| | | | 264/496 |
| 2017/0298726 A1* | 10/2017 | Smith | .................. E21B 49/005 |

* cited by examiner

*Primary Examiner* — Yong-Suk Ro
(74) *Attorney, Agent, or Firm* — Rachel E. Greene (57) ABSTRACT

A method for identifying a wellbore condition includes capturing a first image of cuttings on or downstream from a shale shaker using a first camera. A size, shape, texture, or combination thereof of the cuttings in the first image is analyzed. A wellbore condition may be identified based on the size, shape, texture, or combination thereof of the cuttings in the first image.

2 Claims, 8 Drawing Sheets

SHALE SHAKER IMAGING SYSTEM

CROSS-REFERENCE TO RELATED APPLICATION

This application claims priority to U.S. Provisional Patent Application having Ser. No. 62/263,452, filed on Dec. 4, 2015. The entirety of this priority provisional patent application is incorporated by reference herein.

BACKGROUND

In the wellbore construction process, in-situ rocks are broken down by a drill bit to generate a wellbore. These rock cuttings are then carried to the surface by a fluid called drilling mud. The drilling mud is then passed through sieves mounted on equipment called a "shale shaker" where the rock cuttings are separated from the drilling mud. The sieves on the shale shaker are vibrated to improve the efficiency of the separation process. The separated rock cuttings fall over the edge of the sieve into an appropriate disposal mechanism.

There are several factors that affect the size, shape, and amount of rock cuttings during the wellbore construction process. These include the type of drill bit used, the mechanical parameters used during the drilling operation, the compressive strengths of the rocks, and other parameters dictated by geomechanics.

A phenomenon called "caving" may also be observed during the drilling of the wellbore. Caving refers to large rock masses that have failed through naturally-occurring weak planes or through the disturbance of an in-situ pressure regime that may exist within the rocks. As the drilling process alters the stress regimes of the rock, it may trigger an instability in the wellbore causing the rocks to cave in.

Some types of rocks (e.g., shale) are sensitive to their chemical environment. For example, when the rocks contact the drilling fluid, the rocks may swell, weaken, and eventually collapse in the wellbore. The above-mentioned process may affect the characteristic shape of some of the rock cuttings. For example, the shape, size, and amount of a first portion of the rock cuttings may be driven by the cutting structure of the drill bit while a second portion of the rock cuttings generated by fractured caving may exhibit flat and parallel faces with differing bedding planes. Angular-shaped rock cuttings with curved surfaces having a rough texture and/or splintered-shape rock cuttings may indicate a higher stress regime in rocks. Thus, by having a continuous analysis on the shape of the rock cuttings, a user may be able to establish a situation with regards to wellbore stability and may take corrective actions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A method for identifying a wellbore condition is disclosed. The method includes capturing a first image of cuttings on (or downstream from) a shale shaker using a first camera. A size, shape, texture, or combination thereof of the cuttings in the first image may be determined. A wellbore condition may be identified based on the size, shape, texture, or combination thereof of the cuttings in the first image.

In another embodiment, the method includes capturing visual data of cuttings in a visible light spectrum using a first camera and capturing visual data of the cuttings in an infrared light spectrum using a second camera. At least a portion of the visual data from the first camera is combined with at least a portion of the visual data from the second camera to generate a common image. The common image is compared to images stored in a database. A wellbore condition that corresponds to the common image is identified in response to comparing the common image to the images.

A system for identifying a wellbore condition is also disclosed. The system includes a shaker that separates cuttings from a drilling mud. A first camera is positioned proximate to a downstream edge of the shaker and captures a first image of the cuttings. A computer system receives the first image from the first camera, determines a size, shape, texture, or combination thereof of the cuttings in the first image, and identifies a wellbore condition based on the size, shape, texture, or combination thereof of the cuttings in the first image.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both, objects or steps, respectively, but they are not to be considered the same object or step.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
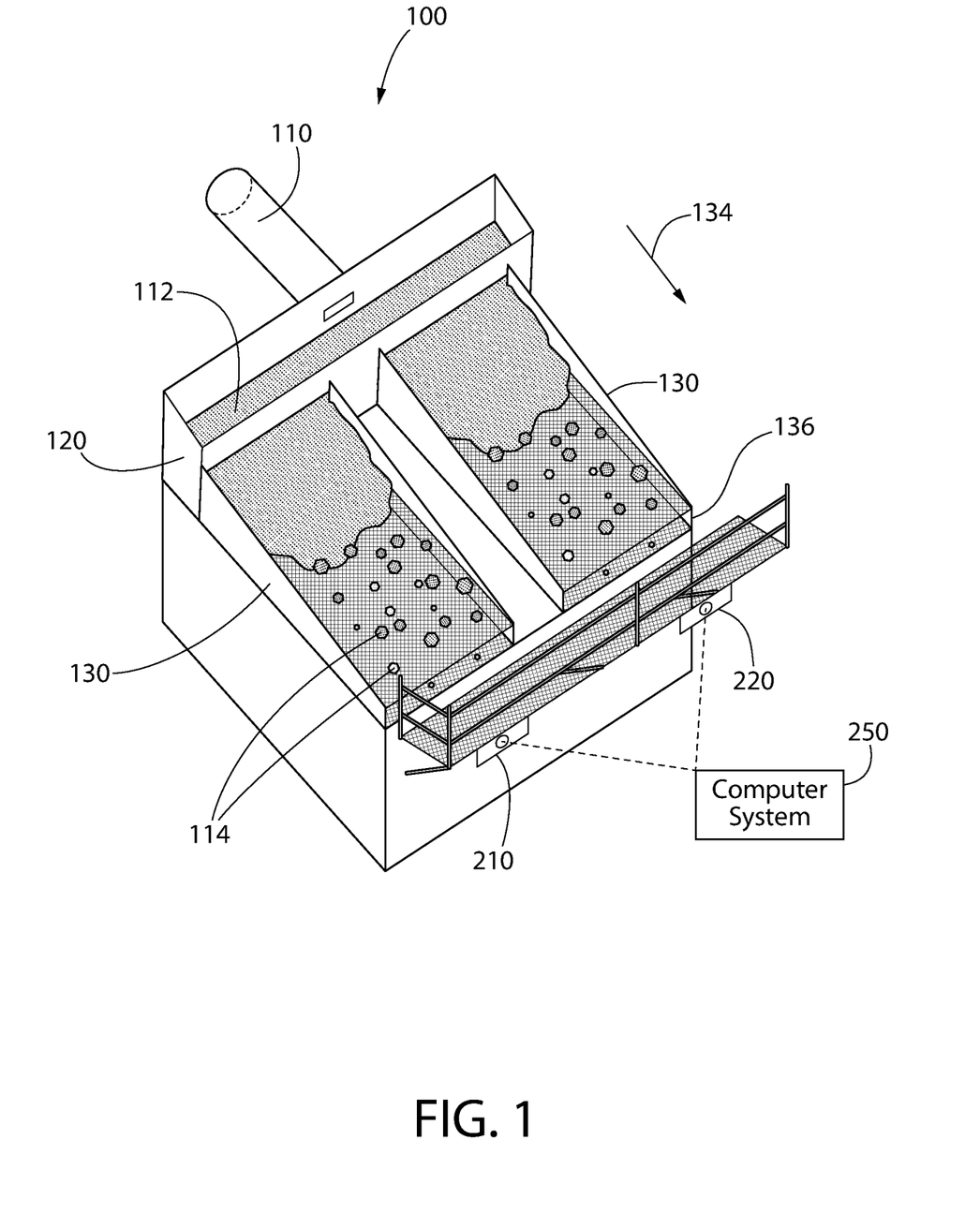
FIG. 1 illustrates a top view of a shaker assembly having one or more visual capture devices coupled thereto, according to an embodiment.

FIG. 1 illustrates a top view of a shaker assembly 100 having one or more visual capture devices (two are shown: 210, 220) coupled thereto, according to an embodiment. The shaker assembly 100 may include an inlet line 110 configured to introduce a drilling mud 112 from a wellbore into initial distribution tank (also called "Header box") 120. The drilling mud 112 from the wellbore may have a plurality of cuttings 114 dispersed therein.

The shaker assembly 100 may also include one or more shakers (two are shown: 130). The drilling mud 112 may flow from the initial distribution tank 120 into the shakers 130. Each of the shakers 130 may be or include a sieve (e.g., a wire-cloth screen) having a plurality of openings formed therethrough, and each opening may have an average cross-sectional length (e.g., diameter) from about 780 microns to about 22.5 microns. The drilling mud 112 (with the cuttings 114 therein) may flow along the shakers 130 in the direction 134 (i.e., away from the initial distribution tank 120).

The fluid in the drilling mud 112, and any solid particles having a cross-sectional length less than the cross-sectional length of the openings in the shaker 130, may flow through the openings in the shaker 130. Solid particles (e.g., cuttings 114) having a cross-sectional length greater than or equal to the cross-sectional length of the openings in the shaker 130 may not flow through the openings in the shaker 130. Rather, these cuttings 114 may pass over a downstream edge 136 of the shaker 130 and into a cuttings holding tank 150 (see FIG. 2). Thus, the shaker assembly 100 may be configured to separate the cuttings 114 from the drilling mud 112. In at least one embodiment, a slide may be positioned at the downstream edge 136 of the shaker 130. The cuttings 114 may travel down the slide after flowing over the downstream edge 136 of the shaker 130. The slide may not vibrate.

The visual capture devices 210, 220 may be positioned proximate to (e.g., within 5 meters) and/or coupled to the shaker assembly 100. As shown, the first visual capture device 210 may be positioned in front of the downstream edge 136 of one of the shakers 130, and the second visual capture device 220 may be positioned in front of the downstream edge 136 of the other shaker 130.

Figure 2:
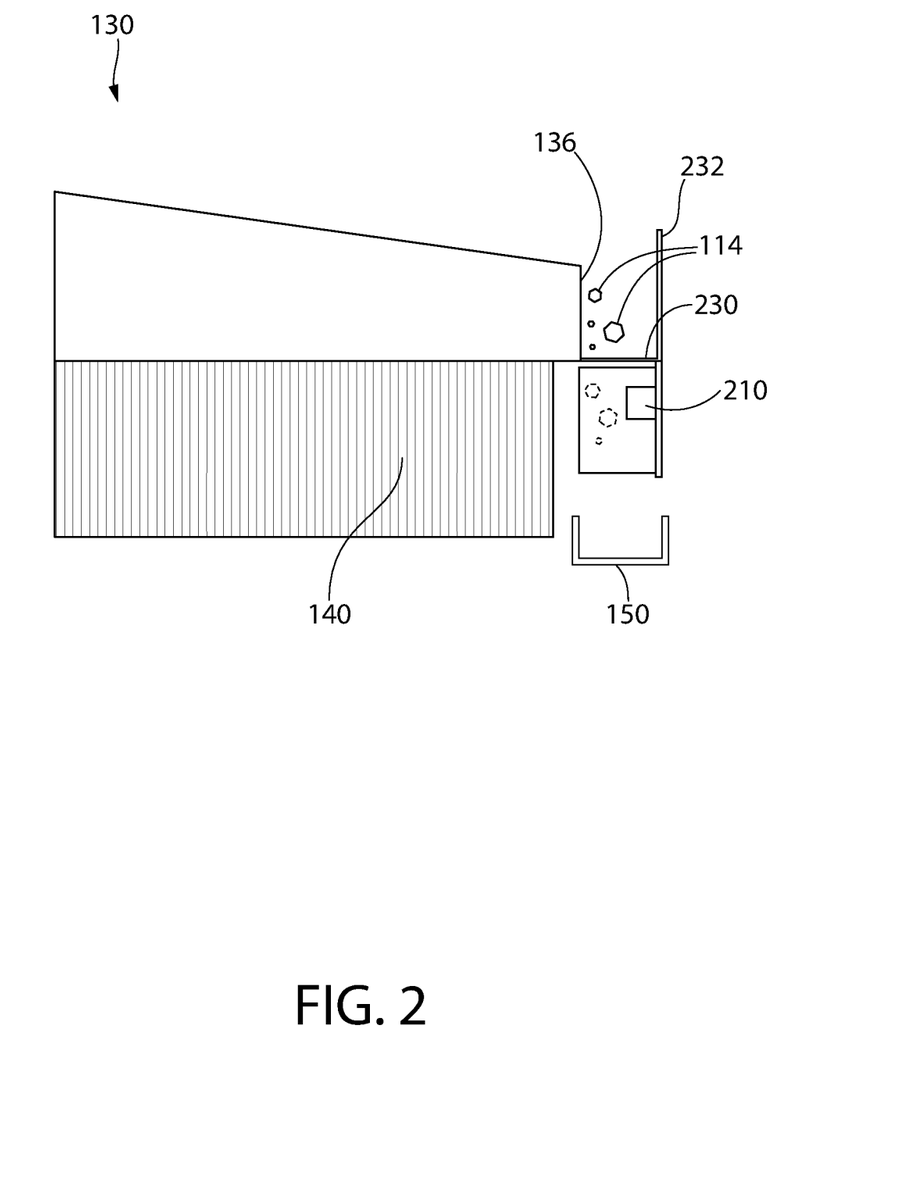
FIG. 2 illustrates a side view of the shaker assembly and the first visual capture device, according to an embodiment.

FIG. 2 illustrates a side view of the shaker assembly 100 and the visual capture device 210, according to an embodiment. A settling tank 140 may be positioned underneath the shaker 130. The drilling mud 112 that flows through the openings in the shaker 130 may fall into the settling tank 140. From there, the drilling mud 112 may be repurposed. As shown, the visual capture device 210 may be positioned beneath a walkway 230 and/or a railing 232. The visual capture device 210 may also be laterally-offset from the downstream edge 136 of the shakers 130.

Figure 3:
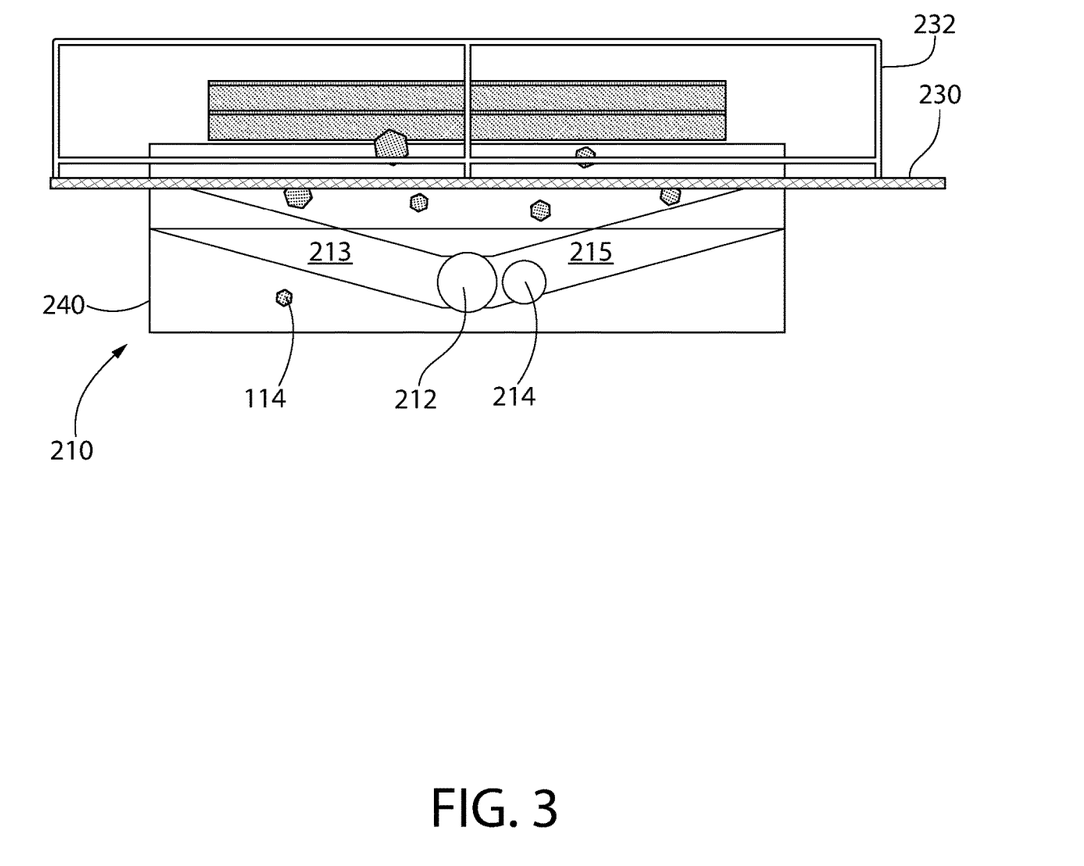
FIG. 3 illustrates a rear view of the first visual capture device, according to an embodiment.
Figure 4:
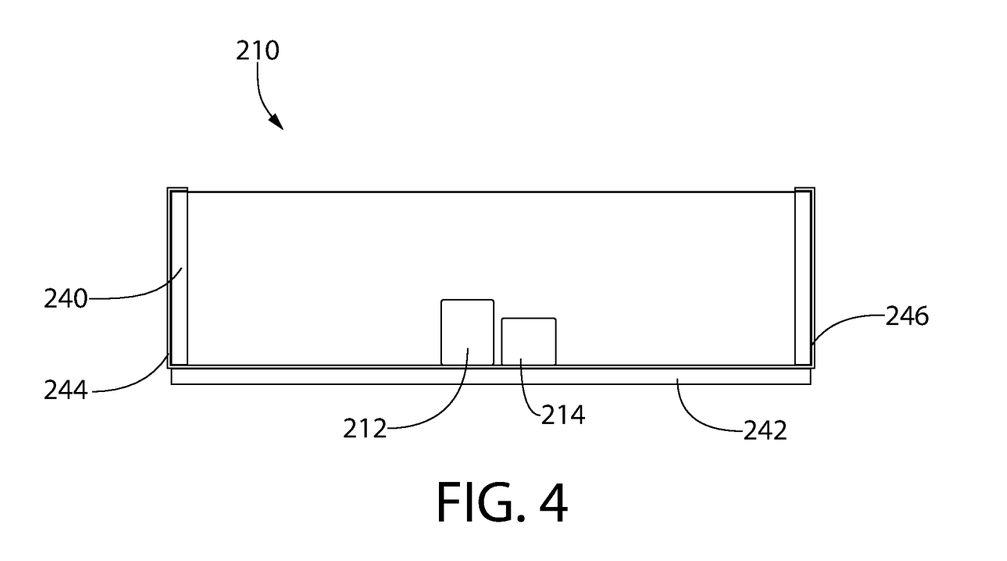
FIG. 4 illustrates a top view of the first visual capture device, according to an embodiment.

FIGS. 3 and 4 illustrate a back view and a top view of the visual capture device 210, according to an embodiment. The visual capture device 210 may include a rectangular metal box 240 having the front and bottom surfaces removed. The back side 242 of the box 240 may include a bracket, and opposing sides 244, 246 of the box 240 may be or include metal protective plates.

The visual capture device 210 may include one or more cameras (two are shown: 212, 214). The cameras 212, 214 may be coupled to the bracket on the back side 242 of the box 240. The cameras 212, 214 may have an ingress protection of 67. The cameras 212, 214 may have a speed ranging from about 1 Hz to about 400 Hz, and a resolution ranging from about 320×256 pixels to about 1280×1024 pixels.

The cameras 212, 214 may capture visual data of the cuttings 114 as the cuttings 114 are on the shaker 130, as the cuttings 114 are falling from the shaker 130, or when the cuttings 114 are in the cuttings holding tank 150. In one embodiment, the cuttings 114 may fall through the field of view 213, 215 of the cameras 212, 214 as they fall toward the cuttings holding tank 150.

The first camera 212 may be configured to capture visual data in the visible light spectrum (e.g., wavelengths from about 380 nm to about 700 nm). The second camera 214 may be configured to capture visual data in the thermal/infrared spectrum (e.g., wavelengths from about 700 nm to about 1 mm). The visible light spectrum images may be useful in determining cutting size. The thermal images may be particularly useful in determining surface texture and/or geometry, as the cuttings 114 may be hotter than the background. The visual data from the cameras 212, 214 may be or include one or more images and/or a (e.g., continuous) video stream. The cameras 212, 214 may transmit this visual data to a processing resource 250 either via a cable 252 or wirelessly (see FIG. 1) or process the data in-situ. The processing resource 250 may be a computer system, a flash drive, a microprocessor, a combination thereof, or the like.

A distance between the downstream edge 136 and the cameras 212, 214 may be from about 10 cm to about 100 cm or from about 20 cm to about 60 cm. As a result, a distance between the cuttings 114 and the cameras 212, 214, as the cuttings 114 are falling into the cuttings holding tank 150, may be from about 5 cm to about 95 cm or from about 15 cm to about 55 cm. In some embodiments, one or both of the cameras 212, 214 may include an optical zoom up to about 10×.

Figure 5:
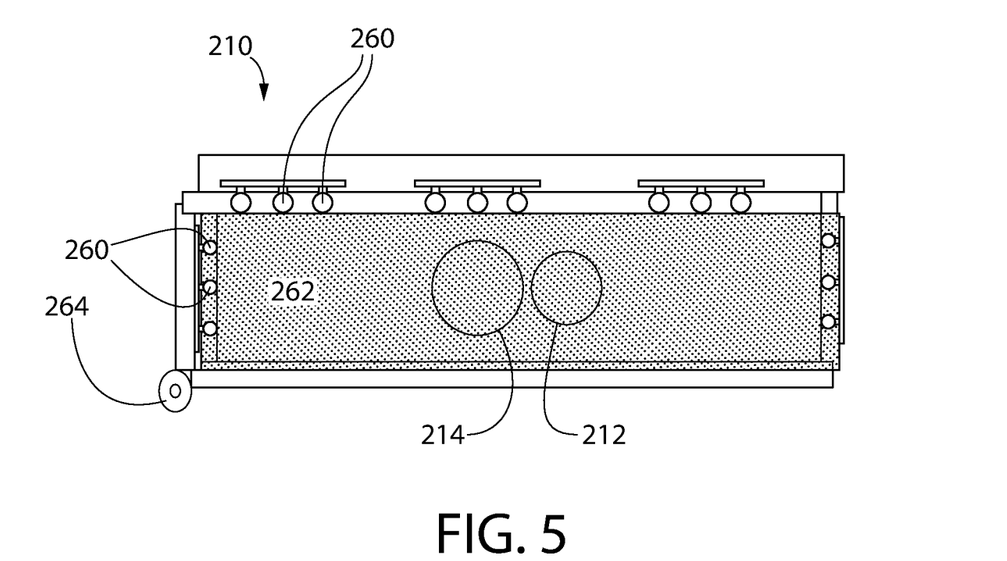
FIG. 5 illustrates a front view of the first visual capture device, according to an embodiment.
Figure 6:
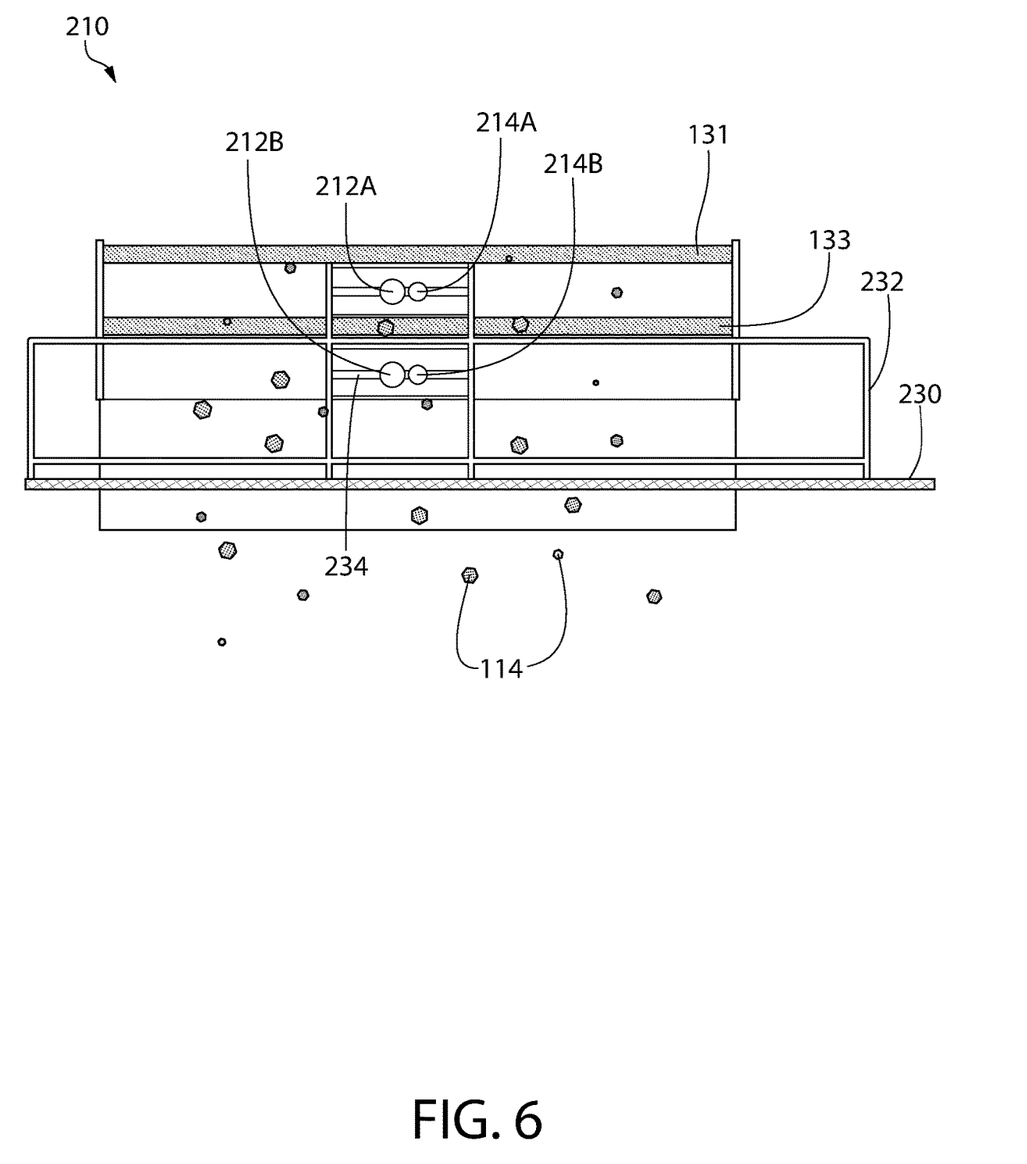
FIG. 6 illustrates a back view of the first visual capture device including two sets of cameras, according to an embodiment.

FIG. 5 illustrates a front view of the visual capture device 210, according to an embodiment. The area in front of the cameras 212, 214 may be illuminated by one or more light sources 260. The light sources 260 may be positioned above, below, in front of, behind, and/or on the side(s) of the cameras 212, 214. In at least one embodiment, a wall or curtain of liquid 262 may be in the field of view 213, 215 of the cameras 212, 214. The liquid may be water or diesel (e.g., with oil-base-mid). For example, the curtain of liquid 262 may be positioned such that the cuttings 114 fall between the curtain of liquid 262 and the cameras 212, 214. The curtain of liquid 262 may create a uniform background noise that may be removed during processing of the visual data. The liquid 262 may be recycled by a small pump 264. The temperature of the liquid may be measured by a temperature sensor and varied in order to obtain the desired contrast for thermal imaging. In at least one embodiment, the light source 260 may be or include a strobe light configured to emit pulses of light. This may help to freeze the movement of the cuttings 114 and to better illuminate the surfaces of the cuttings 114. In at least one embodiment, the light source 260 may project a structured light. More particularly, the light source 260 may project a known pattern of light on the cuttings 114 (e.g., in an infrared spectrum). The deformation of the pattern may allow the visual capture device 210 to identify and calculate geometrical information of the cuttings 114. A calibration pattern may be projected to remove distortion created by optics and visual capture device perspective FIG. 6 illustrates a back view of the visual capture device 210 including two sets of cameras 212A, 212B, 214A, 214B, according to an embodiment. The shaker 130 may include an upper deck 131 and a lower deck 133. In this instance, two or more first cameras 212A, 212B and two or more second cameras 214A, 214B may be used. As shown, one of the first (e.g., visual spectrum) cameras 212A may be positioned axially-adjacent to the upper deck 131, and another of the first (e.g., visual spectrum) cameras 212B may be positioned axially-adjacent to the lower deck 133. Similarly, one of the second (e.g., thermal spectrum) cameras 214A may be positioned axially-adjacent to the upper deck 131, and another of the second (e.g., thermal spectrum) cameras 214B may be positioned axially-adjacent to the lower deck 133. The cameras 212A, 212B, 214A, 214B may be positioned above the walkway 230, as shown. More particularly, the cameras 212A, 212B, 214A, 214B may be coupled to the railing 232 that extends upwards from the walkway 230. For example, the cameras 212A, 212B, 214A, 214B may be coupled to a bracket 234 that is coupled to the railing 232.

Figure 7:
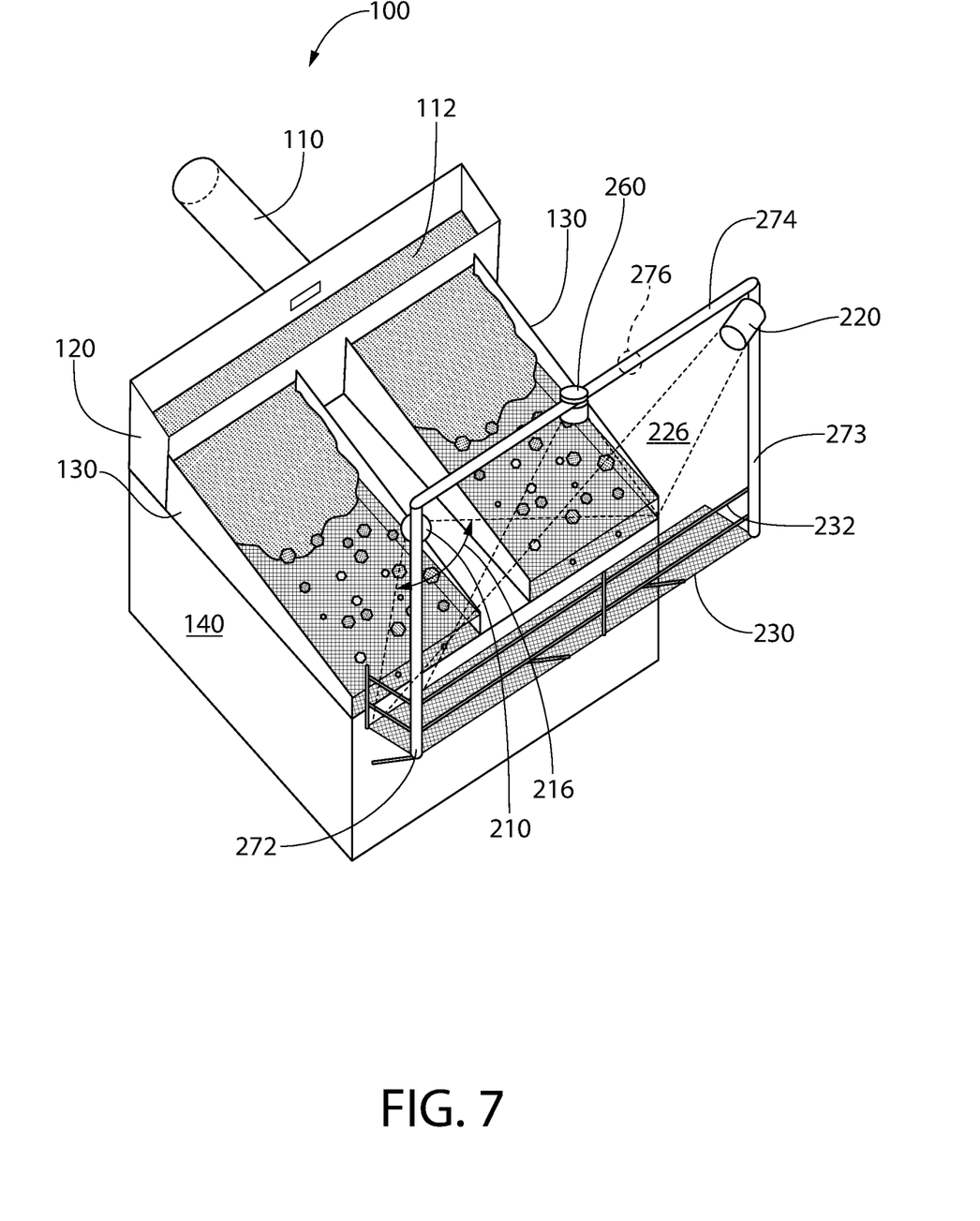
FIG. 7 illustrates a top view of the shaker assembly and the visual capture devices, according to an embodiment.

FIG. 7 illustrates a top view of the shaker assembly 100 and the visual capture devices 210, 220 coupled, according to an embodiment. A structure may be placed in front of the shakers 130. The structure may include one or more vertical poles (two are shown: 272, 273) and one or more horizontal poles (one is shown: 274). As shown, the visual capture devices 210, 220 may be coupled to the vertical poles 272, 273. For example, the first visual capture device 210 (e.g., including the cameras 212, 214) may be coupled to the first vertical pole 272, and the second visual capture device 220 (also including visual and/or thermal cameras) may be coupled to the second vertical pole 273. A light source 260 may be coupled to the horizontal pole 274 between the two vertical poles 272, 273. As discussed above, the light source 260 may be a projector that projects light downward in a structured light and/or calibration pattern.

The light may shine on the cuttings 114 as the cuttings 114 are on the shakers 130, as the cuttings 114 fall over the downstream edge 136 of the shakers 130, or as the cuttings rest in the cuttings holding tank 150. In at least one embodiment, the cameras (e.g., cameras 212, 214) in the first visual capture device 210 may have a field of view 216 that captures the cuttings 114 as they fall through the light. The field of view 216 shown in FIG. 7 may be or include the fields of view 213, 215 shown in FIG. 3, or the field of view 216 may be different. Similarly, the cameras in the second visual capture device 220 may have a field of view 226 that captures the cuttings 114 as they fall through the light. As shown, the fields of view 216, 226 may at least partially or completely overlap. This may facilitate a detection of the size and/or shape of the cuttings 114. For example, the same field from two different perspectives may enhance depth perception in the analysis of the images, thereby providing greater accuracy in the analysis of the cuttings 114. In at least some embodiments, three-dimensional relief images may be produced by analysis of the two images captured by the visual spectrum cameras (e.g., camera 212) in the two visual capture devices 210, 220.

In at least one embodiment, a motion detector 276 may be positioned proximate to the shakers 130 and detect motion of the shakers 130 (e.g., as the shakers vibrate), the drilling mud 112, the cuttings 114, or a combination thereof. The motion detector 276 may cause the light sources 260 and/or the curtain of water 262 to turn or remain on when motion is detected, and the light sources 260 and/or the curtain of water 262 may be turned off or remain off when no motion is detected. In another embodiment, the power supply for the shaker assembly 100 may be linked to the light sources 260 and/or the curtain of water 262 such that the shaker assembly 100, the light sources 260, and/or the curtain of water 262 may be turned on and turned off together (e.g., with a single flip of a switch).

Figure 8:
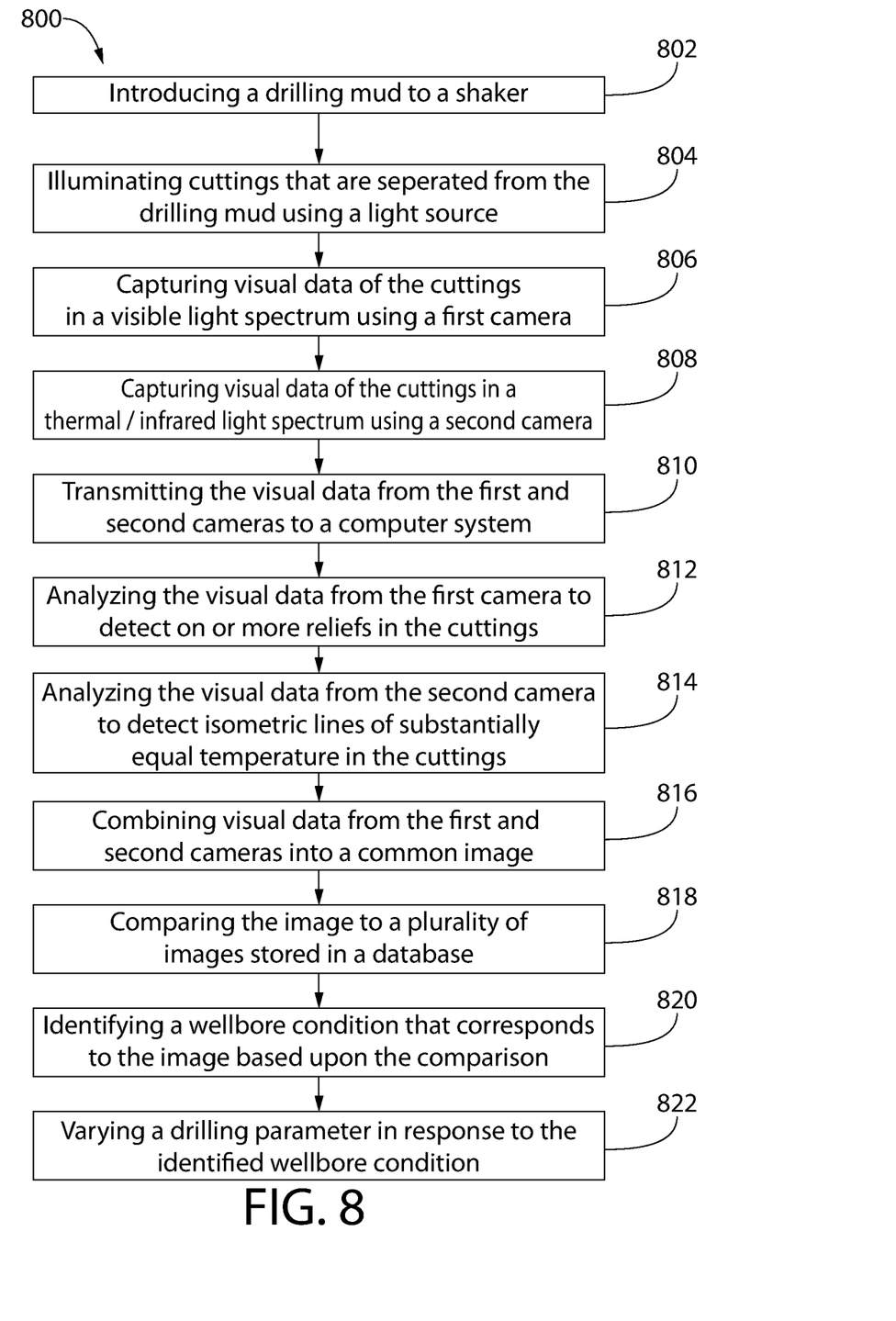
FIG. 8 illustrates a flow chart of a method for identifying a wellbore condition based upon visual data of a cutting, according to an embodiment.

FIG. 8 illustrates a flow chart of a method 800 for identifying a wellbore condition based upon visual data of wellbore cuttings, according to an embodiment. The method 800 may be performed using the visual capture device(s) 210, 220 shown in FIGS. 1-7; however, in other embodiments, the method 800 may be performed using other components. The method 800 may begin by introducing a drilling mud 112 into a shaker 130, as at 802. A first portion of the drilling mud 112 may pass through openings in the shaker 130 and into a settling tank 140 (see FIG. 2). A second portion of the drilling mud (e.g., cuttings 114) may fall over the downstream edge 136 of the shaker 130 and into a cuttings holding tank 150.

The method 800 may then include illuminating the cuttings 114 using a light source 260, as at 804. The cuttings 114 may be illuminated while they are still on the shaker 130, as they are falling from the shaker 130 into the cuttings holding tank 150, when they are resting in the cuttings holding tank 150, or a combination thereof. As discussed above, in at least one embodiment, the light source 260 may backlight a curtain of water 162. In another embodiment, the light source 260 may be configured to project structured light onto the cuttings 114, which may be used to identify geometrical information (e.g., shape, position, etc.) about the cuttings 114, as described in greater detail below.

The method 800 may also include capturing visual data of the cuttings 114 in a visible light spectrum using a first camera 212, as at 806. The method 800 may also include capturing visual data of the cuttings 114 in an infrared light spectrum (i.e., thermal imaging) using a second camera 214, as at 808. The visual data in the visual light spectrum may be captured before, simultaneous with, or after the visual data in the infrared light spectrum. As discussed above, in some embodiments, two or more first (e.g., visual spectrum) cameras 212A, 212B may be used, with one being positioned adjacent to an upper level deck of the shaker 130 and another being positioned adjacent to a lower deck 133 of the shaker 133. In another embodiment, two or more first (e.g., visual spectrum) cameras 212A, 212B may be used to capture the same cuttings 114 from different, but at least partially or completely overlapping, perspectives.

The captured images may cover a defined length of the shaker 130 or the slide. This corresponds to a slice/portion of the global view of the shaker 130. The length of the visual slice may be larger than the longest cutting 114. As this slice has a certain extent, the same "small" cutting 114 may appear in multiple images at different positions. The analyzing (introduced below) may not count the same cutting 114 multiple times in the histogram of cutting size. In one embodiment, two images may be taken at different times, and the time between the images may be large enough so that the same cutting 114 is not present in both images. This time may be predefined based on the setting of the shaker 130 and/or mud and drilling conditions. This allows the system and/or the user to estimate the time for the cutting 114 to travel over some zone of the shale shaker sieve. In another embodiment, the images may be captured with a short time between the images so that the analyzing may recognize the same (i.e., a common) cutting 114 travelling along the image slice in both images. This cutting 114 may then be counted a single time in the histogram.

The method 800 may include transmitting the visual data from the first camera(s) 212 and the second camera(s) 214 to a processing resource 250, as at 810. The method 800 may then include analyzing the visual data from the first camera(s) 210, using the processing resource 250, to detect one or more reliefs in the cuttings 114, as at 812. As used herein, the term "relief" refers to the variation of elevation on the surface of the cuttings 114. More particularly, analyzing the visual data from the first camera(s) 210 may include applying one or more edge detection techniques to the cuttings 114 to detect the reliefs. The processing resource 250 may also analyze the visual data from the first camera(s) 210 to determine the size, shape, and/or number of the cuttings 114. The processing resource 250 may then compile the statistics of the reliefs, size, shape, and/or number to generate a particle size distribution of the cuttings 114.

The method 800 may also include analyzing the visual data from the second camera(s) 220, using the processing resource 250, to detect isometric lines for defining the surface features of the cuttings 114, as at 814. In one embodiment, the visual data from the second camera(s) 220 may be analyzed to detect isometric lines of substantially equal temperature in the cuttings 114. As used herein, "substantially equal temperature" refers to a difference in temperature (e.g., thermal sensitivity) that is greater than or equal to about 0.05° C. The processing resource 250 and/or the user may use this information to define the morphology of the cuttings 114.

In at least one embodiment, the analyzing at 812 and 814 may include distinguishing cuttings 114 generated by the drill bit from cuttings not generated by the drill bit (e.g., cuttings generated by caving, etc.). This may also include determining a percentage of the cuttings 114 that are generated by the drill bit and a percentage of the cuttings 114 that are not generated by the drill bit.

In another embodiment, the analyzing at 812 and 814 may include separately analyzing the visual data from the upper deck 131 and the lower deck 133. More particularly, the cuttings 114 contained in the visual data from the upper deck 131 may be filtered out of the visual data from the lower deck 133. Then, one particle distribution may be generated using the statistics from the cuttings 114 from the upper deck 131, and a separate particle distribution may be generated using the statistics from the cuttings 114 from the lower deck 133. This information may be used to evaluate the efficiency of the shaker 130 for a given shaker screen size. In another embodiment, the analyzing at 812 and 814 may include analyzing the visual data from two or more first (e.g., visual spectrum) cameras 212 and/or from two or more second (e.g., infrared light spectrum) cameras 214.

The method 800 may also include combining at least a portion of the visual data from the first camera 212 and at least a portion of the visual data from the second camera 214 into a common image, as at 816. More particularly, an image from the visual data from the second camera 214 may be superimposed into/onto or overlap with an image from the visual data from the first camera 212 to generate a common three-dimensional relief image.

The method 800 may then include comparing, using the processing resource 250, the (e.g., three-dimensional relief) image to a plurality of three-dimensional relief images stored in a database, as at 818. The plurality of three-dimensional relief images stored in the database may be linked to and/or be indicative of a particular wellbore condition. More particularly, the cuttings shown in the plurality of three-dimensional relief images may be known to be from a portion of a subterranean formation that experienced a particular wellbore condition. Illustrative wellbore conditions may include a mechanical wellbore instability condition, a rock-chemical interaction wellbore instability condition, a drilling practice related wellbore instability condition, or the like.

The method 800 may then include identifying a wellbore condition that corresponds to the (e.g., three-dimensional relief) image based at least partially upon the comparison, as at 820. The method 800 may then include varying a drilling parameter in response to the identified wellbore condition, as at 822. The drilling parameter may be or include the density of the fluid (e.g., drilling mud) being pumped into the wellbore, the rheological properties of the fluid (e.g., drilling mud), the weight on the drill bit ("WOB"), the rotation rate of the drill string, or a combination thereof.

Figure 9:
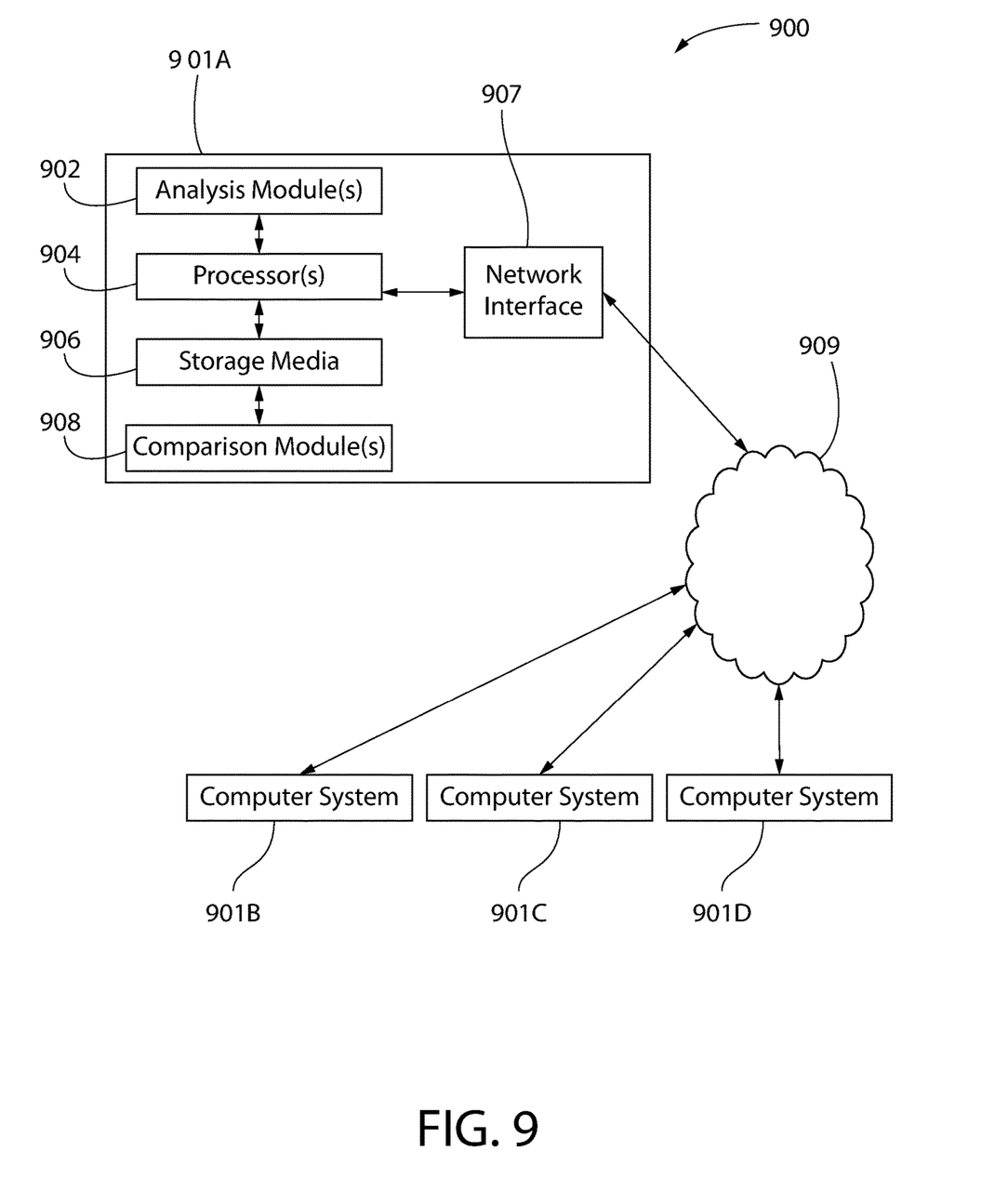
FIG. 9 illustrates a computing system for performing the method disclosed herein, according to an embodiment.

In some embodiments, the methods of the present disclosure may be executed by a computing system. FIG. 9 illustrates an example of such a computing system 900, in accordance with some embodiments. The computing system 900 may include a computer or computer system 901A, which may be an individual computer system 901A or an arrangement of distributed computer systems. In at least one embodiment, the computer system 901A may be the processing resource 250 described above. The computer system 901A includes one or more analysis modules 902 that are configured to perform various tasks according to some embodiments, such as one or more methods disclosed herein. To perform these various tasks, the analysis module 902 executes independently, or in coordination with, one or more processors 904, which is (or are) connected to one or more storage media 906. The processor(s) 904 is (or are) also connected to a network interface 907 to allow the computer system 901A to communicate over a data network 909 with one or more additional computer systems and/or computing systems, such as 901B, 901C, and/or 901D (note that computer systems 901B, 901C and/or 901D may or may not share the same architecture as computer system 901A, and may be located in different physical locations, e.g., computer systems 901A and 901B may be located in a processing facility, while in communication with one or more computer systems such as 901C and/or 901D that are located in one or more data centers, and/or located in varying countries on different continents).

A processor may include a microprocessor, microcontroller, processor module or subsystem, programmable integrated circuit, programmable gate array, or another control or computing device.

The storage media 906 may be implemented as one or more computer-readable or machine-readable storage media. Note that while in the example embodiment of FIG. 9 storage media 906 is depicted as within computer system 901A, in some embodiments, storage media 906 may be distributed within and/or across multiple internal and/or external enclosures of computing system 901A and/or additional computing systems. Storage media 1406 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURRY® disks, or other types of optical storage, or other types of storage devices. Note that the instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, the computing system 900 contains one or more comparison module(s) 908. In the example of computing system 900, computer system 901A includes the comparison module 908. In some embodiments, a single comparison module may be used to perform one or more embodiments of the method 800 disclosed herein. In other embodiments, a plurality of comparison modules may be used to perform the method 800 herein. The comparison module(s) 908 may be configured to compare the visual data of the cuttings 114 to the previously-captured images of cuttings to help determine which wellbore condition(s) may correspond to the cuttings 114 in the visual data.

It should be appreciated that computing system 900 is only one example of a computing system, and that computing system 900 may have more or fewer components than shown, may combine additional components not depicted in the example embodiment of FIG. 9, and/or computing system 900 may have a different configuration or arrangement of the components depicted in FIG. 9. The various components shown in FIG. 9 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method for identifying a wellbore condition, comprising:
    capturing a first image of cuttings on or downstream from a shale shaker using a first camera;
    determining a size, shape, texture, or combination thereof of the cuttings in the first image;
    identifying a wellbore condition based on the size, shape, texture, or combination thereof of the cuttings in the first image; and
    capturing a second image of the cuttings on or downstream from the shale shaker, wherein the first and second images are successive and are separated by a predefined amount of time based at least partially upon an axial velocity of the cuttings over a portion of the shake shaker.

2. The method of claim 1, further comprising processing the first and second images to recognize a common cutting of the cuttings in the first and second images.

* * * * *